Figure 5:
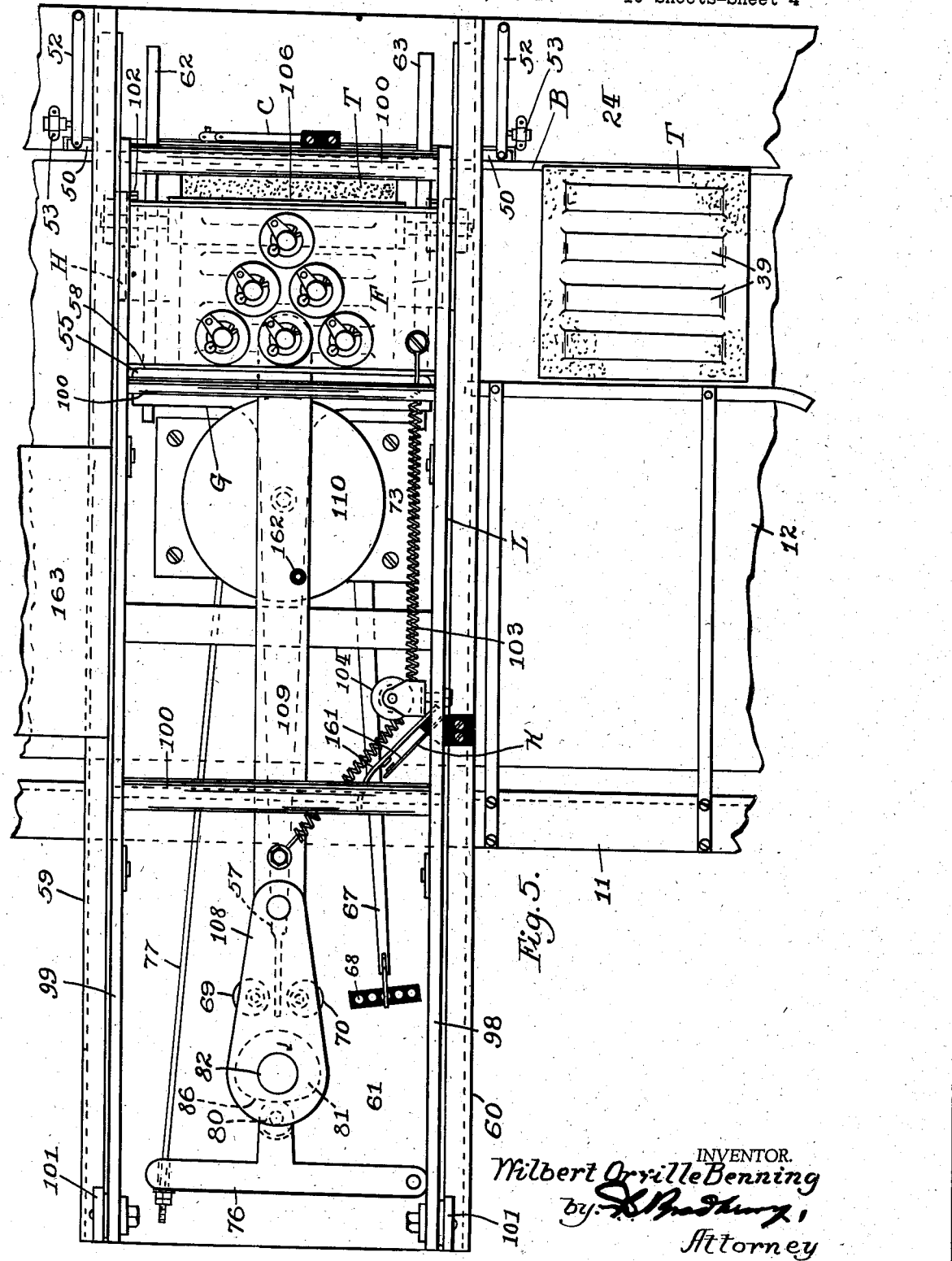

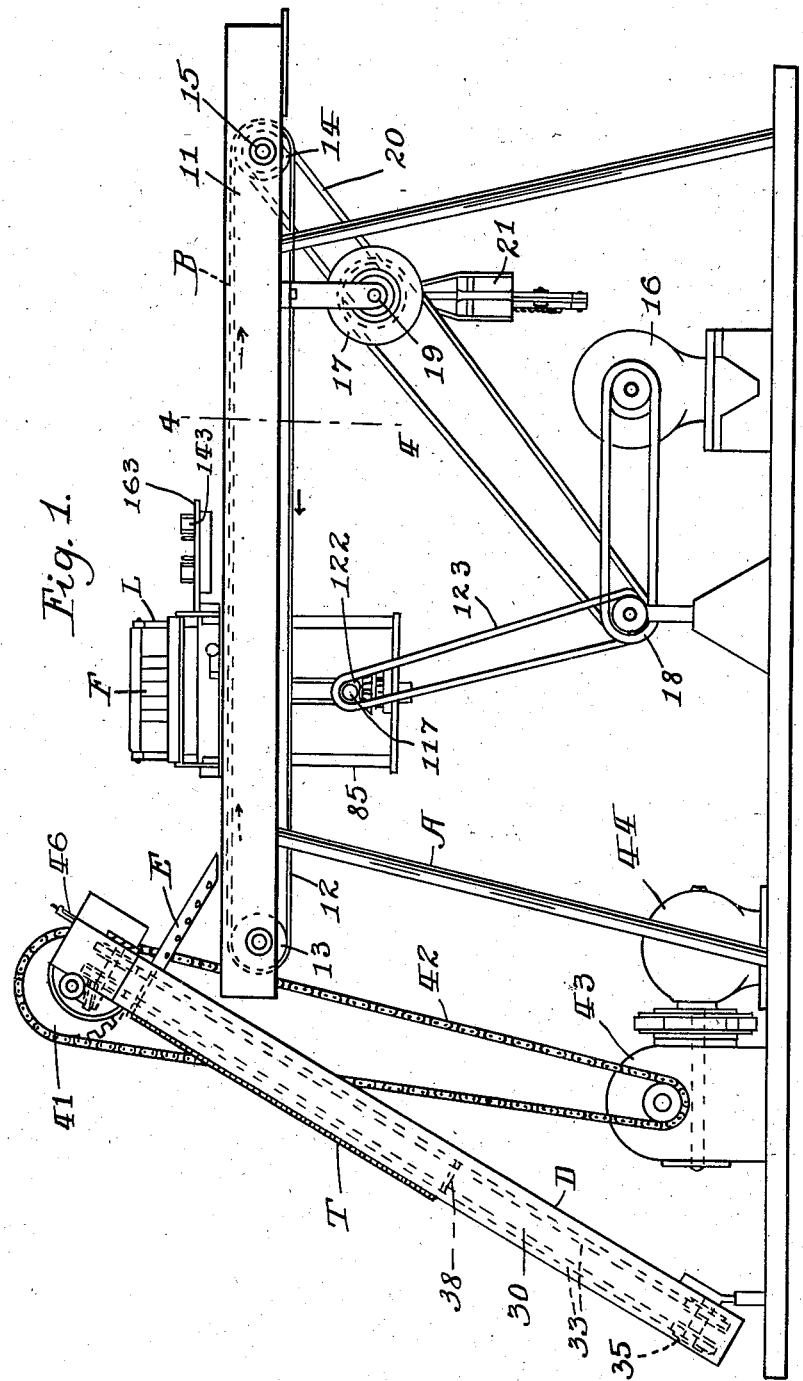

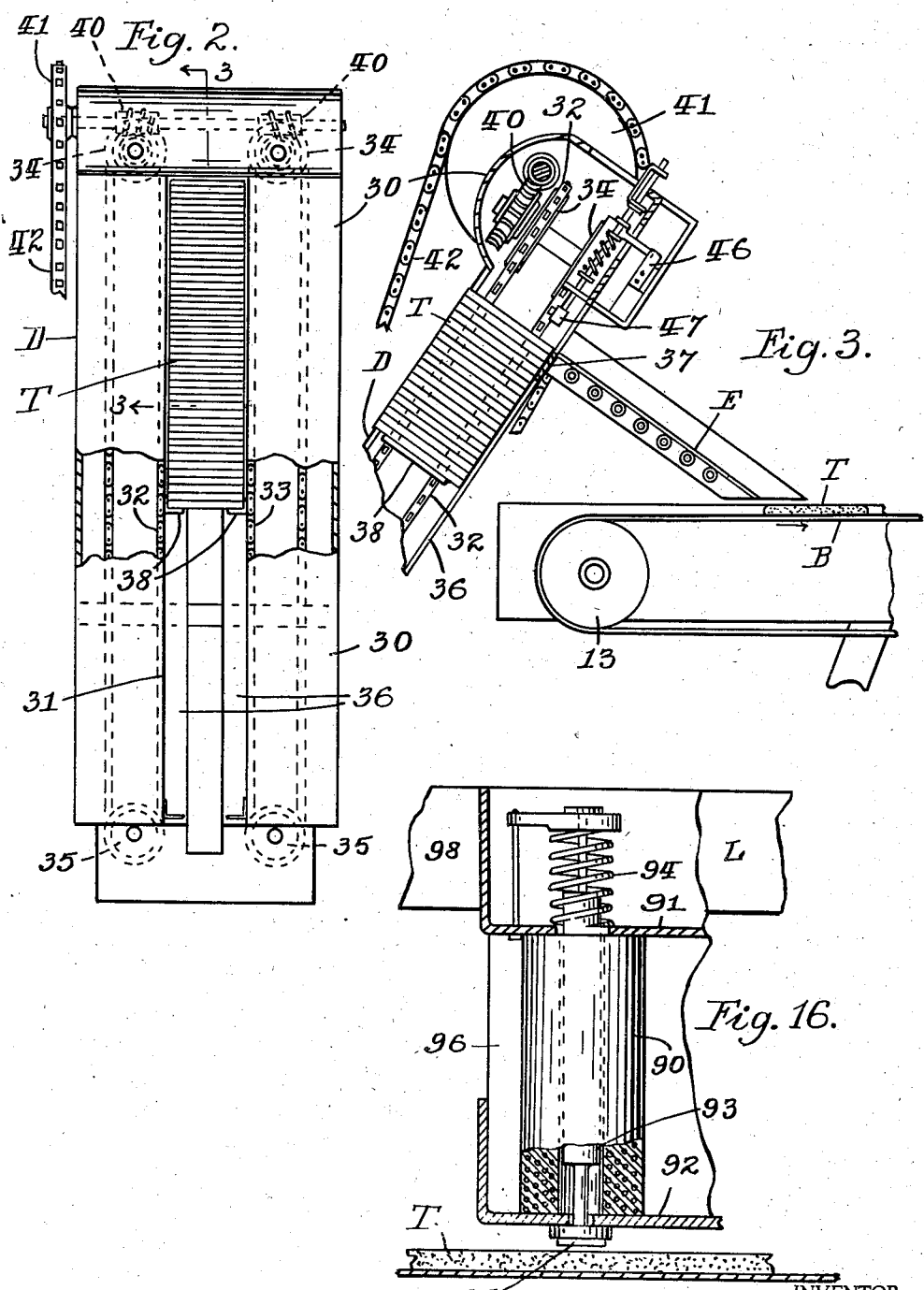

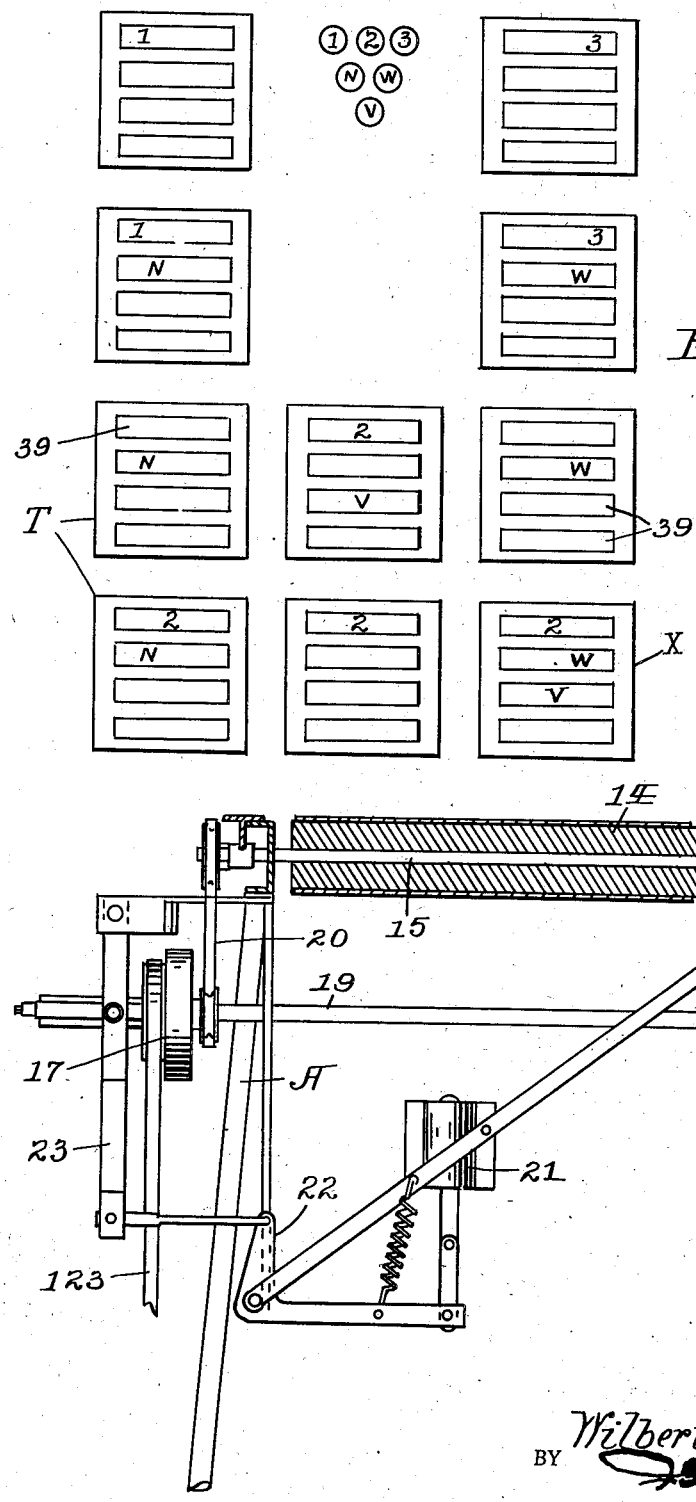

April 17, 1945.   W. O. BENNING   2,373,941
SIZING MACHINE
Filed Oct. 30, 1941   10 Sheets-Sheet 5
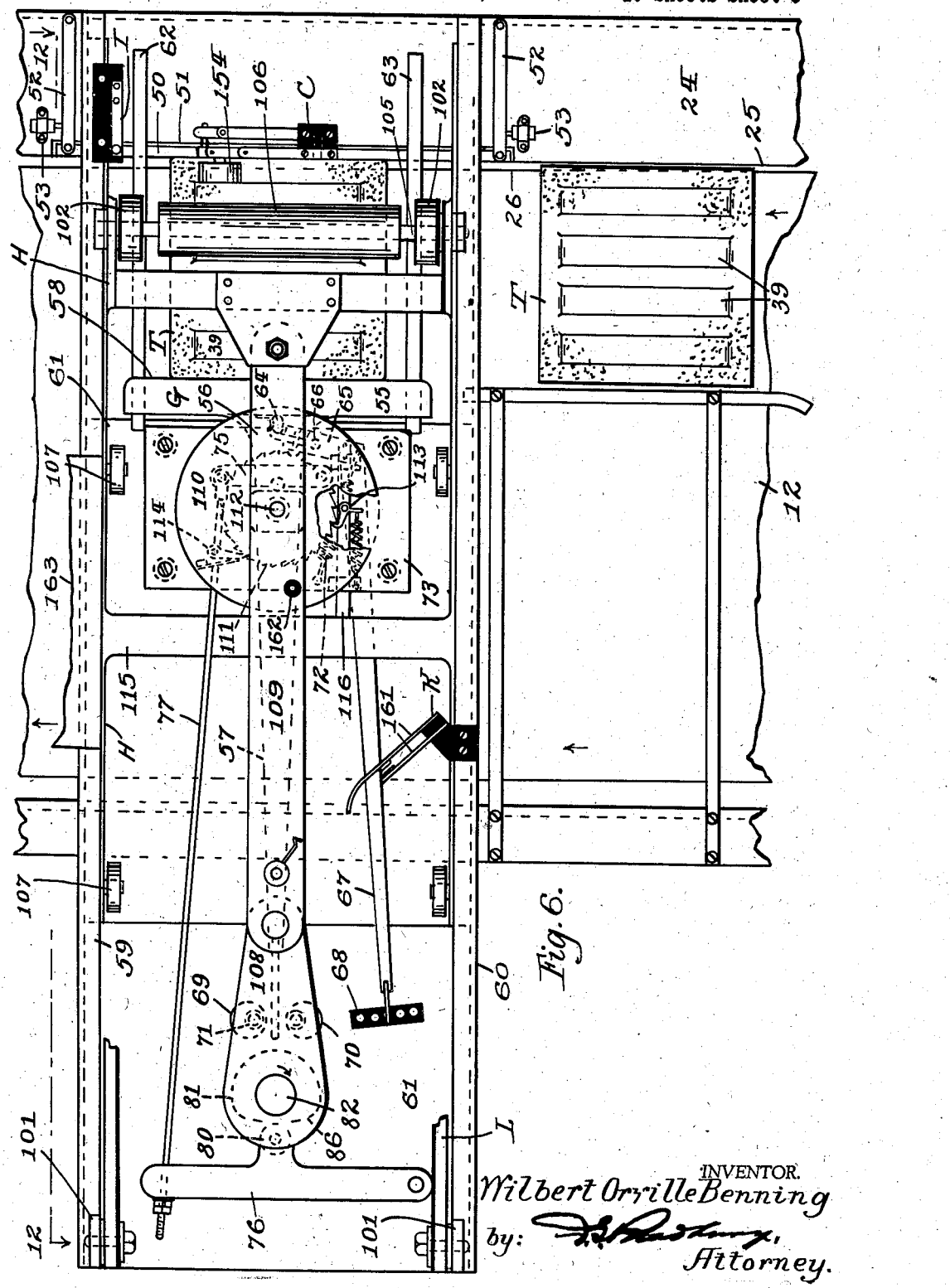
Fig. 6.
INVENTOR.
Wilbert Orville Benning
by: Attorney.

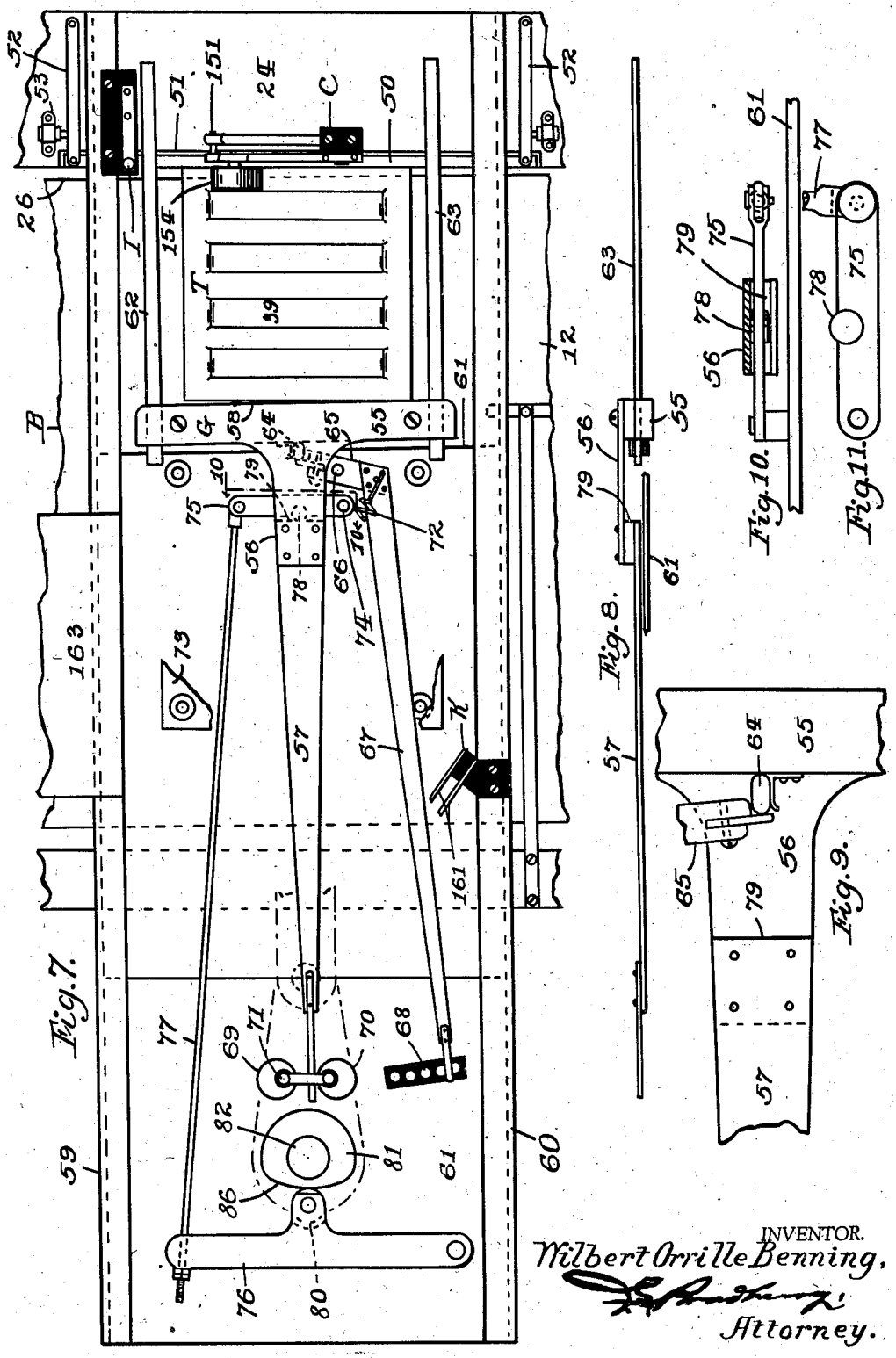

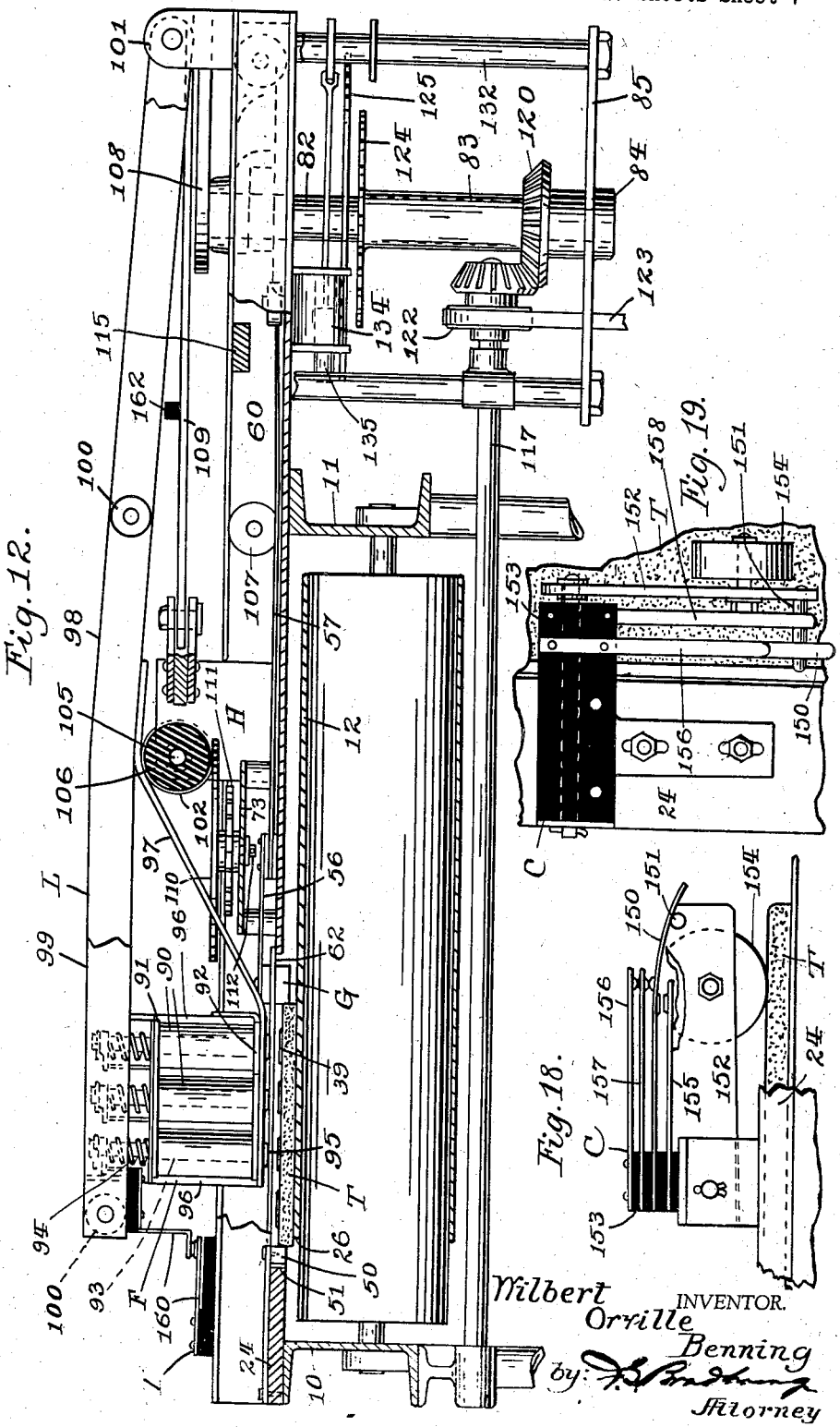

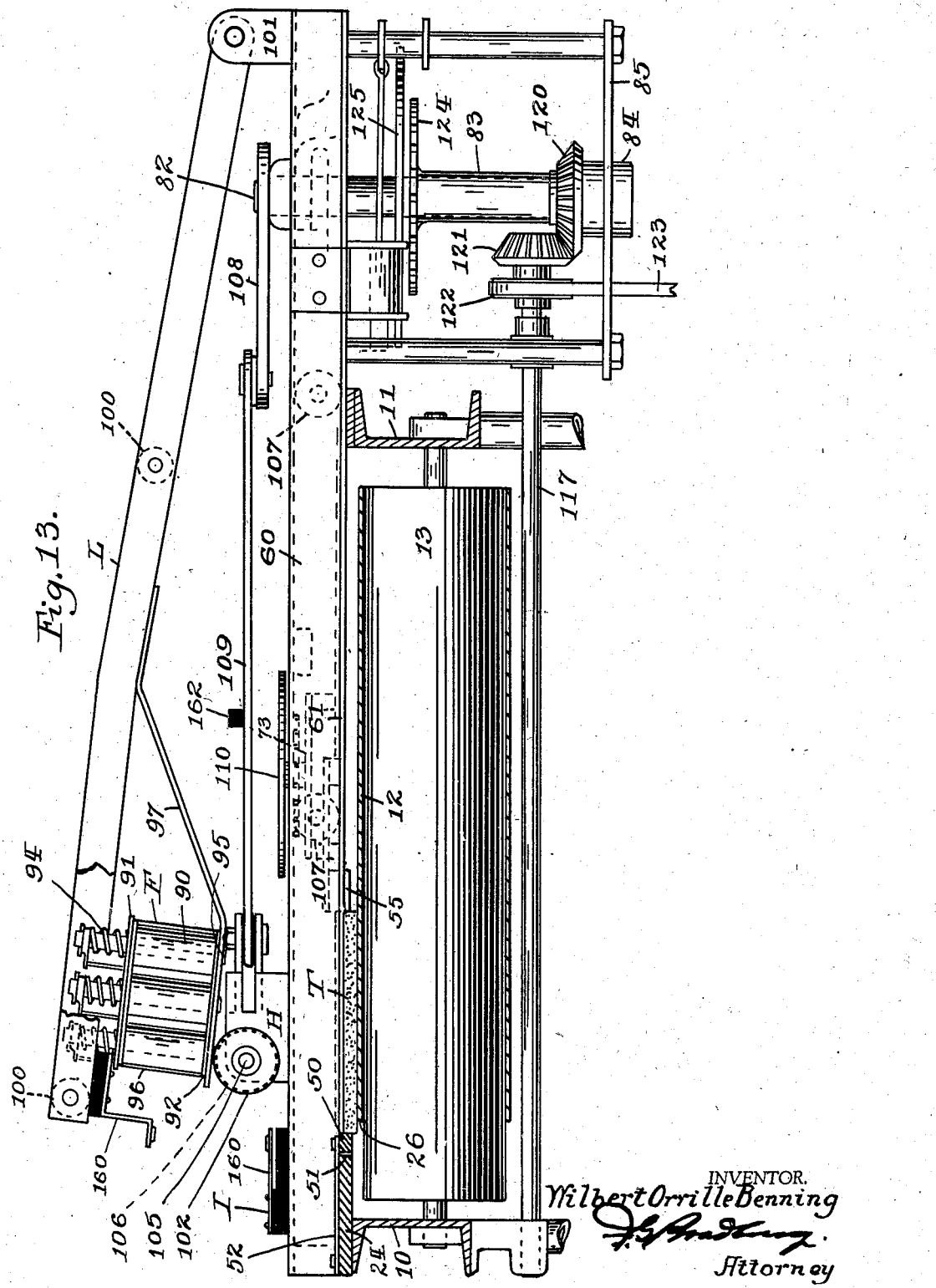

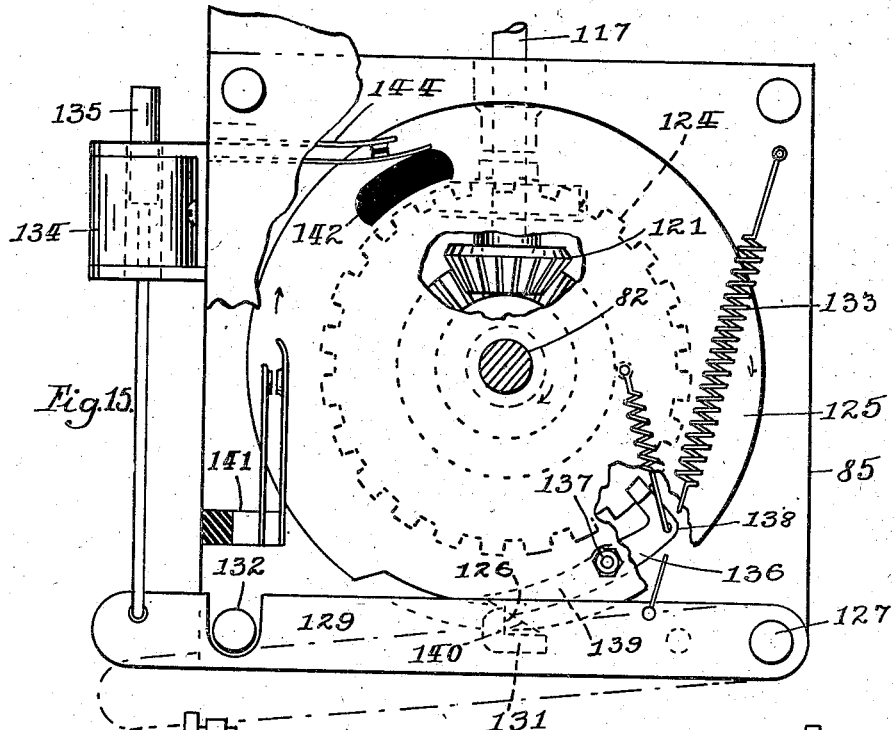
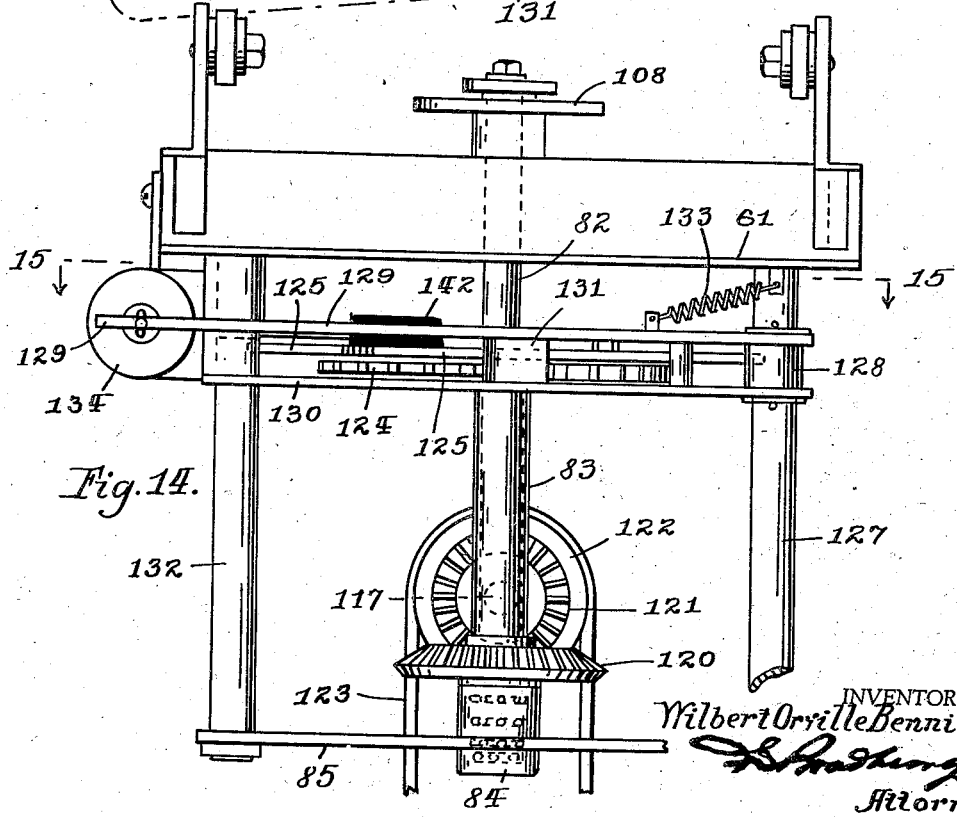

Patented Apr. 17, 1945

2,373,941

UNITED STATES PATENT OFFICE 2,373,941

SIZING MACHINE

Wilbert Orville Benning, Los Angeles, Calif., assignor to Pacific Clay Products Company, a corporation of California Application October 30, 1941, Serial No. 417,175

4 Claims. (Cl. 101—43)

This invention relates to improvements in machines for determining the sizes of objects and is particularly shown and described herein with relation to the grading of tiles and the like. Tiles produced by the use of forming or press machines and by firing in a kiln are usually uneven in size, varying from those which are perfect to those which are of uneven width and taper between their opposed side edges. The principal work performed by my invention is to gauge and mark tiles after they are received from the kiln according to their width and taper, whereby they are more easily and quickly sorted into groups according to their degree of perfection. An object of the invention is the production of a machine which will perform the above functions automatically in an efficient manner. A further object is the production of a machine of the character stated which will operate rapidly and automatically while performing the above functions, whereby time, labor and expense in the manufacture of tiles are reduced to a minimum. Grading of tiles in this manner has heretofore been generally accomplished by hand or at best only partly by the aid of machine. This has been found laborious and usually has resulted in imperfect sorting. By the use of my invention these objections are reduced to a minimum and the ultimate product is thereby improved in quality and accuracy as to classification.

While the following description pertains to a machine for grading square tiles it will be understood that with or without modification the machine is equally applicable for grading tiles and other objects or other shapes without departing from the spirit of the invention.

Briefly my improved machine employs the following principal cooperating elements which operate in sequence and will later be described in detail as illustrated by the accompanying drawings, forming part of this specification: 1st, a carrier in the form of an endless belt traveling step by step so as to place tiles successively in registering position to be measured; 2nd, a feeder by which tiles are fed successively to the carrier; 3rd, a gauge coasting with suitable compensating abutment to grip each tile as it is delivered into registration therewith by the carrier and to measure the width and taper of the tile so held, and 4th, a stamping instrumentality suitably controlled to record on each tile the characteristics determined by the gauge.

Figure 20:
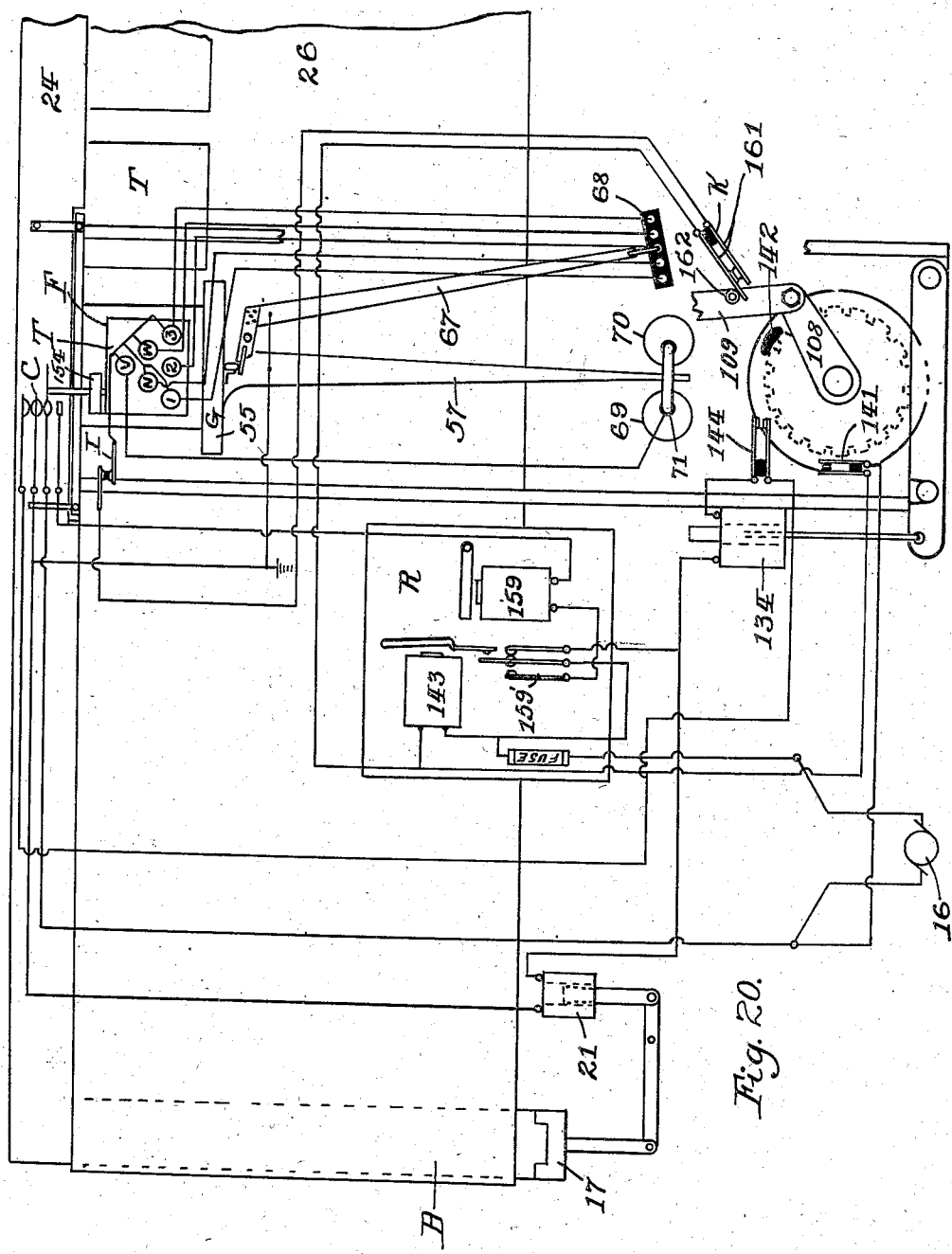

These elements are assembled and caused to cooperate in the following manner as will be hereinafter described:

In the accompanying drawings forming part of this specification, Fig. 1 is a side elevation of my improved sizing machine, the parts thereof being shown to some degree, schematically on account of the reduced scale necessary by the size of the drawing; Fig. 2 is an end elevation of the elevator by which the tiles are fed into the machine; Fig. 3 is a section of a detail taken approximately on line 3—3 of Fig. 2; Fig. 4 is a section of a detail taken approximately on line 4—4 of Fig. 1, showing the clutch mechanism by which a step by step motion is imparted to the carrier; Fig. 5 is a plan showing the parts in position immediately following a complete cycle; Fig. 6 is a plan similar to Fig. 5, excepting that the over-head frame and stamping mechanism are removed so as to expose the inking plate and gauge mechanism more clearly; Fig. 7 is a plan similar to that shown in Figs. 5 and 6, excepting that the entire stamping and inking mechanisms are removed to expose the gauge and switch control more clearly, the gauge elements being shown when they are about to measure the width and taper of a tile; Fig. 8 is a side elevation of the gauge for measuring taper, removed from the machine; Fig. 9 is a bottom plan of a portion of the gauge shown in Fig. 8; Fig. 10 is a section of a detail taken on line 10—10 of Fig. 7, showing the bearing between the gauge head and its actuating lever arm; Fig. 11 is a plan of the actuating lever arms shown in Fig. 10; Fig. 12 is a section approximately on line 12—12 of Fig. 6, showing the stamping mechanism in lowered registering position in readiness to record the measurement made by the gauge on the tile; Fig. 13 is a view similar to Fig. 12, excepting that the carriage is in forward position and the stamping mechanism raised immediately following the inking of the stamps; Fig. 14 is an end view of the operating mechanism illustrated in Fig. 12, showing the clutch mechanism which controls the reciprocation of the carriage; Fig. 15 is a section taken approximately on the line 15—15 of Fig. 14; Fig. 16 is a side elevation partly broken away and in section of a detail showing one of the stamps; Fig. 17 is a plan illustrating the manner in which the stamps are adapted to record the measurements as to width and taper on the backs of the tiles; Fig. 18 is a side elevation of a detail showing the master switch; Fig. 19 is a plan of the structure shown in Fig. 18, and Fig. 20 is a schematic diagram illustrating the operation of my improvement.

In the drawings, A indicates a main frame which may be of any suitable construction. As shown it is provided with a pair of longitudinal side channel members 10 and 11 between which is a longitudinal carrier B. This carrier is composed of an endless belt 12 having its uppper lap traveling forwardly in the direction of the arrows shown in Fig. 1, over the idle and drive pulleys 13 and 14, which are journaled in the side members of the frame and driven by shaft 15. The shaft 15 in turn is revolved to impart a step by step forward movement of the belt by a suitable driving motor 16 (see Fig. 1), through the interposed friction clutch 17 (see Fig. 4), the driving element of which is driven by the belted counter shaft connection 18 and the driven member of which is connected through counter shaft 19 and pulley and belt connection 20 to the driving shaft 15. The friction clutch is controlled as will hereinafter be described by an actuating solenoid 21 on the frame. This solenoid is connected through the link and bell crank connection 22 (see Fig. 4), and operating lever 23 with the driving member of the clutch. The functioning of the solenoid to control the operation of the clutch and in turn the operation of the carrier is through the medium of a master switch C as will be hereinafter described. A narrow longitudinal plate 24 is secured to the upper face of the side member 10 and is provided with an inner straight edge 25 projecting inwardly and disposed parallel with the inner vertical face of said side member. The carrier belt has its upper lap slightly below the level of said plate (see Fig. 12) and its adjacent edge 26 spaced slightly inwardly from said straight edge. The belt is arranged so that said adjacent edge 26 diverges slightly as the belt advances away from said straight edge (see Fig. 6) to immediately remove the tile from its registering position against the edge 25 of the plate 24 and prevent any tendency to wear or abrade the edge 25.

D indicates an elevator by which the tiles T are fed successively onto the receiving end of the carrier adjacent to the inner edge 26 of the carrier belt. This elevator may be of any suitable type, that shown employing a housing 30 having an upwardly extending channel 31 and pairs of endless chain belts 32 and 33 traveling over suitably arranged upper drive sprockets 34 and lower idle sprockets 35 journaled in said housing. The inner upwardly traveling laps of these link belts are spaced apart a suitable distance to admit a stack of the tiles therebetween with their lower edges resting upon bottom plates 36. The housing inclines upwardly and forwardly and near its upper end has a gate 37 (see Fig. 3) across the space between the bottom plates. Pairs of flights 38 are carried by the belts at longitudinally spaced intervals upon which the tiles are stacked with their finished faces downwardly and their ribs 39 on their backs disposed longitudinally of the machine (see Figs. 6 and 12). Driving mechanism for the elevator of any suitable construction is provided and as shown consists of worm gearing 40 connected to the drive sprockets 34 and the main drive sprocket 41, link belt 42, speed reduction gearing 43 and motor 44. As each stack of tiles is raised upwardly at even surface speed in substantial synchronism with the advancing movement of the carrier belt, the tiles are released successively by the gate 37 and slide down an inclined conveyor or chute E onto the carrier belt B. The carrier belt which advances at suitable surface speed receives and moves the tiles forwardly with their finished surfaces down and in regular order at evenly spaced intervals apart. If the tiles in the elevator accidentally become jammed as they are fed to the chute, an automatic switch 46 of any suitable construction having an actuating trip 47 (see Fig. 3) in the path of the tiles thus jammed is adapted to open the operating circuit (not shown) connected with the operating motor 44 and stop the feed elevator until the obstruction has been remedied by an attendant. The elevator as described enables an operator to load tiles continuously upon the flights 38 without interrupting the operation of the device.

In position to coordinate with the gauge and recording mechanism, which will hereinafter be described, a tile compensating abutment resembling a bar 50 is let into the longitudinal recess 51 in the straight edge 25 of the longitudinal plate 24 (see Fig. 7). Normally the outer edge of this bar is in alignment with the straight edge of the plate and is freely hung on the outer ends of a pair of normally disposed links 52. These links are pivoted by their inner ends upon the surface of the plate and are poised between the pair of spring elements 53 of equal strength. In the operation of sizing, a tile is brought with one of its opposed side edges against the compensating abutment bar 50 following each stop by the carrier belt B. If for any reason the tile is not brought squarely against the abutment bar 50, as pressure is applied to the opposed edge of the tile by the gauge G, then bar 50 will move slightly to the right or left to compensate for a binding effect that might otherwise occur, thus allowing the tile to move into true registering position.

The use of the gauge and recording means employed by my invention is for determining automatically the overall dimensions between two opposite edges of each tile and to record on each tile the results of such measurement, as the tiles are conveyed through the machine by the carrier. The use of the gauge and recorder employed further is to determine automatically any taper between the two opposite edges so measured and to also record on each tile the results of such measurement. The gauge G (see Fig. 7) by which these measurements are made has a movably disposed head element 55 mounted upon a yoke frame 56 from which an electrical switch arm 57 extends laterally. The head piece is positioned in the machine substantially in the plane of and opposite the compensating abutment 50 to cooperate therewith. Normally it is spaced laterally from the abutment, sufficiently to allow the tiles to be moved freely therewith by the carrier. It also has an inner straight edge 58 which is adapted to be moved against and conform with the taper, if any, of the opposite edges of the tile which is measured by the gauge.

A pair of horizontal channel guide rails 59 and 60 are secured in parallel relation across and upon the longitudinal side supporting bars 10 and 11 of frame A. These guide rails have a floor or pan 61 therebetween extending from their laterally projecting extremities and covering a portion of the carrier belt without interfering with the tiles in their longitudinal line of travel and which are supported upon the carrier belt. The gauge is placed within this structure and is supported by a pair of flat arms 62 and 63, the outer ends of which extend rigidly from the opposed ends of the head 55 across the space between the head and compensating abutment 50 and slide freely upon the surface of the longitudinal plate 24. The head is further supported by the rearward ends of the supporting arms 62 and 63 sliding upon the inner end of floor 61, thus permitting free lateral and tilting movement in a horizontal plane to measure both width and taper of each tile fed through the machine. The inner end of a lever arm 65 bears against the inner wall of the gauge head 55 through an antifriction bearing 64 and said lever is pivoted between its ends upon the floor 61 by the pivot 66 and is thus tilted by the lateral movement of the gauge which varies according to the width of tile being measured. The remaining lever arm 65 carries an electrical switch arm 67 which is adapted to sweep over and make electrical contact with the series of switch points 68, the latter being connected with and controlling the printing units of the recording mechanism as will be hereinafter described. Normally when the gauge measures a tile of correct width the switch arm 67 contacts only the middle contact point of the switch as shown in Figs. 5 and 6. When the tile is of under or over size the switch arm changes accordingly and makes contact with the switch point on either side of the center point. The other circuit controlling switch arm 57 plays freely between a pair of adjustable terminals which are in the form of eccentrics 69 and 70 held rigidly by insulated pivots 71 upon the floor 61. Normally, that is when the gauge is in contact with a tile on the carrier and the tile does not taper beyond the tolerance set, the switch arm 57 remains in neutral position out of contact with the adjustable terminals 69 and 70 but if the tile which is measured tapers beyond the tolerance set, the gauge is consequently tilted in a horizontal plane and the switch arm 57 swung accordingly and made to contact either one or the other of said terminals. The terminals 69 and 70 are connected together and with the stamp solenoids of the recording mechanism as will be hereinafter described. A coil retractile spring 72 is connected between the outer end of the lever arm 65 and a fixed table 73 (see Fig. 6). This spring urges the gauge forwardly against the inner edge of the tile which is being measured and presses the latter against the compensating abutment 50 of the gauge mechanism. Simultaneously it urges the electric switch arm 57 either into median position or into a position to record the degree of under or over width of the tile which is being measured. After such recordation the gauge is returned to normal inactive position automatically by the means described immediately following and the carrier belt moves forward a step, thus removing the tile already measured and placing the following tile on the carrier in registering position in readiness for measurement.

The gauge return means consists of a lever 75 which is pivoted at 74 upon the floor 61 and has its free end connected to the outer free end of an actuating lever 76 by the adjustable connecting rod 77. The lever 75 is fulcrumed by a bearing 78, between its ends and impressed against the shoulder 79 of the gauge yoke 56 so that by an outward pull imparted by lever 76 the gauge is withdrawn against the tension of spring 72 from contact with a tile which has been measured. Also by the releasing movement of lever 76 the gauge is permitted to be forced into measuring coaction with a tile. The lever 76 is pivoted at one end on the floor 61 and carries an antifriction fulcrum roller 80 between its ends bearing against an actuating cam 81. This cam is carried by a vertical stub shaft 82 which is journaled in a vertical sleeve shaft 83, both of said shafts being also freely journaled in a suitable step bearing 84. This step bearing is carried by a suitable frame 85 which depends from the projecting ends of the side rails 59 and 60. The cam 81 is shaped so that during a complete revolution of the stub shaft and while a tile is held in registering position by the carrier belt B, the gauge is first released from inactive position to measure a tile and then is returned into its original position. During this complete cycle the recording mechanism is caused to function through a reciprocating movement also imparted by the stub shaft.

Following the adjustment of the gauge to grip a tile between the sizing members, a recording mechanism employing a stamping head is caused to automatically record on each tile, measuring characters determined by the gauge. These characters are adapted to indicate overall dimensions or width transversely between two opposite edges of the tile or the like, and longitudinal taper, if any between said edges.

The stamping head F is composed of a plurality of upright size and taper recording stamps, each of which has an electrical solenoid coil 90, all of the coils being held rigidly between a pair of superimposed horizontal spaced plates 91 and 92. Each of the coils has a core 93 (see Fig. 16), which is held in superior position by a weak helical spring 94 and carries on its lower end a printing type or stamp 95. Through the energizing of the coil its core is thrust downwardly to deliver a printing impression upon the tile. Spacing blocks 96 at each of the opposite sides serve to assist in supporting the plates and the supporting head on a swinging overhead frame L and the pair of parallel lower guide runners 97. The overhead frame has a pair of side supporting arms 98 and 99 to which the spacing blocks 96 and plates 91 and 92 are secured. These supporting arms are held spaced apart by the cross braces 100 and their inner ends are hinged to swing in a vertical plane upon the bosses 101 which are carried by the guide rails 59 and 60. The pair of guide runners 97 extend downwardly and forwardly from the lower edges of the median portions of the arms 98 and 99 to the lower surface of the stamping head where they assume horizontal position and are fastened. These runners in cooperation with the reciprocably propelled guide rollers 102 serve to raise the stamping head F from the position shown in Fig. 12 into the position shown in Fig. 13, after each gauging and stamping operation. The weight of the overhead frame is partly relieved by the retractile spring 103 which travels over the guide pulley 104 and is connected by its ends to the stamping head F and to the end portion of the connecting rod 109 near the crank arm 108 (see Fig. 5). A sufficient number of the recording stamps is provided for the various measurements recorded upon the tiles which are measured. In the lowered position of the stamping head (see Fig. 12), the stamping core elements assume a position within effective distance immediately above the back of the tile which registers with the gauge and abutment sizing elements and which is supported by the carrier belt.

The size and taper recording stamps are provided with suitable type elements 95 for printing a record on the upwardly facing backs of the tiles showing measurements or suitable characters determined by the gauge. The actuating coils of the stamps are suitably connected with the controlling circuit which is illustrated diagrammatically in Fig. 20 and which shows the coils connected with the contact points 68 over which the switch arm 67 is caused to sweep according to the width of each tile which is determined by the gauge. The recording stamps can be arranged as desired for marking the tiles both as to width and taper. As shown they are grouped in a triangle and provided with printing type indicia representing the following:

2—Standard.
2N—.007 inch below standard.
N—.014 inch below standard.
1N—.021 inch below standard.
1—.028 inch below standard.
2W—.007 inch above standard.
W—.014 inch above standard.
3W—.021 inch above standard.
3—.028 inch above standard.

The relative positioning and manner of marking the tiles with these indices, which is accomplished automatically as they are gauged by my improved apparatus is illustrated in Fig. 17. The above scale is only illustrative and is regulated according to a certain tolerance which is subject to change as desired.

The guide rollers 102 are freely journaled upon the opposite ends of shaft 105 which is journaled in a carriage H and carries the freely journaled inking roller 106. This carriage is guided in the channel guide rails 59 and 60 and is supported upon antifriction rollers 107 which bear upon the floor 61. The carriage is reciprocated in said rails by a crank arm 108 which is mounted on the upper end of the stub shaft 82 and revolves in a horizontal plane. The free end of the crank arm is movably connected with the carriage by the connecting rod 109 and during a complete revolution reciprocates the carriage a complete forward and backward stroke. During the forward portion of the stroke the overhead frame L and stamping head F are raised by the carriage and the printing type of the head inked by the inking roller and during the return portion of the stroke the carriage is returned to inactive position. While returning the inking roller is inked by traversing an inking plate 110. The inking plate resembles a disk which is pivotally mounted upon the fixed table 73. This table is supported on the floor 61 above the gauge mechanism and connecting rod 109. During each revolution of the stub shaft the inking disk is changed in position to spread the ink evenly by revolving step by step through the operation of suitable ratchet mechanism employing the main ratchet wheel 111, mounted on the pivot 112 of the disk, spring pressed ratchet dog 113 and click pawl 114 (see Fig. 6). The ratchet mechanism is actuated by a transverse bar 115 on the carriage which strikes the ratchet actuating bar 116 near the end of each forward portion of the stroke of the carriage as shown in Fig. 6.

The stub shaft 82 is driven by the driving sleeve 83 which in turn is continuously revolved by intermeshing bevel gears 120 and 121 and driving pulley 122, said gear 121 and pulley 122 being mounted on a counter shaft 117 which together with gear 120 and sleeve 83 are suitably journaled in the appended frame 85. The driving pulley 122 is revolved at suitable speed by the belt 123 which is in driving connection with the motor 16 (see Fig. 1).

Normally the driving sleeve or quill 83 and stub shaft 82 are revolubly free but coaxially arranged and connected at predetermined intervals of rotation by suitable clutching means to operate the gauge and the carriage and cause the functioning of the stamping head. This clutching means comprises a horizontal toothed driving disk 124 which is integral with the upper end of sleeve 83, and a companion superimposed driven disk 125 of larger diameter rigidly connected to the stub shaft, said driven disk having a stop engaging shoulder 126 let into its periphery. Pivoted upon the upright member 127 of the appended frame 85 by bearing 128 is a pair of horizontal arms 129 and 130, which carry a combined stop and trip 131. The outer ends of these arms fold inwardly against the companion upright member 132 of the appended frame, being notched to admit said member. The stop and trip member 131 functions to engage and hold the stub shaft and the crank arm from revolving at the end of each cycle of operation of the machine, being forced into engagement with the stop shoulder 126 by the retractile spring 133 which is connected to the upper arm 129 and to a portion of the appended frame 85. The pair of stop and trip members 129 and 130 swing outwardly against the tension of spring 133 to disengage the combined stop and trip member 131 from the shoulder 126. When released, member 131 rides freely upon the periphry of disk 125. The combined stop and trip 131 is released by energizing the coil of solenoid 134 at the proper time immediately after a fresh tile has been moved into registering position by the carrier between the coacting sizing members 50 and 55. This solenoid has its propelling core 135 connected to the free end of the upper member 129 so as to urge the pair of members carrying the combined stop and trip out of engagement. The clutching action between shaft members 82 and 83 is produced by a dog 136 which is secured between its ends by the pivot 137 upon the driven disk 125 and has its work end 138 arranged to engage the teeth of the driving disk 124 and its operating end 139 disposed to sweep over the beveled shoulder 140 on the combined stop and trip 131 and thus trip the dog out of engagement at the end of each cycle of operation of the machine. Thus when the solenoid 134 is energized the dog 136 is released into engagement with the toothed disk 124 and causes the crank arm 108 and cam 81 to revolve and reciprocate the carriage H and gauge controlling element 75.

Primarily the functioning of the carrier, gauge and stamping mechanism is controlled electrically and these elements are driven by a suitable source of power such as motor 16, independently but in synchronism with the operation of the tile feed elevator D. A suitable circuit is provided, such as is illustrated diagrammatically in Fig. 20, for causing the various parts to function in proper sequence. A spring restoring normally open electric switch 141 is mounted on the appended frame 85 in the path of the insulated switch closing brush 142 between and when the driving and driven disks 124 and 125 are connected and revolve, so as to sweep over and close a controlling circuit for a brief instant to restore through the energizing of a relay mechanism R a circuit for operating the carrier belt at a later instant. This restoring occurs for a brief instant during the early portion of a complete revolution of the driven stub shaft 82. Also a normally open solenoid cut out switch 144 is mounted on the appended frame 85 in the path of said switch closing brush 142. This spring switch is adapted to open the circuit through solenoid coil 134, thus permitting the lever arms 129 and 130 to be swung by spring 133 with dog 136 into engagement with shoulder 126, for the purpose as will be hereinafter described.

The master switch C (see Figs. 18, 19 and 20) is composed of a multiple set of switch arms, the arm 150 of which is raised or lowered by a shaft 151 carried by a swinging link 152. This link is swung from a suitable insulated support 153 on the side plate 24 and carries on its free end a roller 154 in the path of the tiles such as T, to be raised against the tension of the spring 158 (see Fig. 19), by each tile as it moves into registering position with the gauge elements. In this manner the shaft 151, when raised, opens the lower pair of normally closed spring switch arms 150 and 155, and closes the upper contacts of the normally open upper switch arms 150, 156 and 157. The spring arm 158 is carried by the insulated support 153 and its outer end presses down upon the shaft 151. The lower pair of switch arms 150 and 155 when open prevents a relay 159, including the relay actuated switch 159' from functioning.

The upper switch arms, when closed, actuate solenoid 21, which immediately controls forward motion of belt B. Simultaneously, solenoid 134 is actuated which starts the mechanism by which the tiles are measured and stamped.

A normally open spring switch I and a cooperating normally open spring switch K, connected in series are adapted to control the operation of the recording mechanism. Switch I is supported partly on the plate 24 of the main frame and partly on the overhead frame L and is so arranged that its contact arms 160 are closed by the overhead frame (see Fig. 12), when the latter is in lowered position and the carriage H is at the back end of its stroke, with the stamping elements of the recorder in juxtaposition to the surface of the tile which is in registration. Switch K has its normally open spring contact arms 161 mounted on the side rail 60 in the path of an insulated brush 162 on the connecting rod 109, said brush being positioned so as to sweep against and close the switch arms for a short period during the early portion of the stroke of the carriage H. In this manner the stamping elements are adapted to function at such time as the sizing and tapering measurements have been completed and arms 57 and 67 have come to rest. Then the insulated brush 162 closes contacts 161, which are in series with the printing switch I, thereby causing the proper solenoid coils 90 and recording stamp to function.

The relay controlling elements 143 and 159, including the relay controlled switch 159', are mounted upon a shelf 163 which is secured to the guide rail 59 over and clear of the carrier belt.

The feed elevator is driven continuously at suitable speed by the belt 42 and motor 43, its operation being controlled by the hand operable switch 46 when desired and checked automatically by the trip 47 in case the tiles pile up and jam, should the feed belt B stop functioning for any reason. The vertical drive shaft 83 is also revolved continuously by the motor 16 through the connected belting 123, and the carrier belt is driven step by step to feed the tiles into and out of registering position by the clutch controlled drive 17, which also receives its initial driving power from motor 16. The tiles T are fed forwardly at regular intervals apart by the elevator upon the carrier belt 12 with their backs facing upwardly and the ribs 39 on their backs extending longitudinally. The regularity of feed places the tiles successively and regularly in registering position with the gauge elements G and 50 and below the stamping head F for a period sufficient to permit the gauging mechanism to function. As each tile approaches registering position the roller 154 is raised which closes the upper arms 150, 156 and 157 of switch C, thus energizing solenoid 21 and releasing clutch 17. This stops the forward motion of carrier B. Solenoid 134 is also actuated and releases the dog 136, causing the driving disk to be connected with the driven disk 125 to transmit revolving motion to shaft 82 and revolve the crank arm 108. As shaft 82 revolves the crank arm 108 reciprocates the carriage H from the position shown in Fig. 5, backwardly to the position shown in Fig. 12 and return during a complete cycle of operation. As soon as disk 125 starts rotating the insulated brush 142 releases switch 144 into open position, thereby opening the circuit through solenoid 134. At this time the combined stop and trip 131 rides on the periphery of disk 125. The switch 144 remains open until a cycle of operation is completed whereupon it is again closed as shown in Fig. 15. Upon continued rotation after starting, the roller 80 on arm 76 drops into the depressed portion 86 of the cam, thus releasing the sizing element G under the action of spring 72 and causing its head and compensating abutment 50 to grip the opposite pair of side edges of tile T, register the distance and taper between said edges, and swing their switch arms 57 and 67 accordingly. During this operation the carriage is thrust backwardly and the stamping head F and over-head frame L are lowered with the stamping elements 95 in juxtaposition to the upper surface of the tile to record by printing thereon, as shown in Fig. 12. When lowering, the overhead frame L closes switch I automatically followed by the closing of switch K in series therewith by insulated brush 162, whereupon one or more stamping solenoids such as 90 are energized as controlled by the gauge switch arms 57 and 67. During the further rotation of cam 81 and the return of the crank arm to starting position after stamping has taken place, roller 80 and arm 76 retract the gauge head G, thus releasing the tile from the gauge elements. Immediately following, the insulated brush 142 on driven disk 125 closes switch 144, actuating relay mechanism and switch 159', thus releasing solenoid 21 and closing clutch 17. This causes the carrier belt to resume forward movement and carry the tile which has been measured from beneath and move a fresh tile forward into registering position in readiness to repeat the cycle of operation. As the tile leaves registering position after being measured the switch roller 154 drops, closing switch arms 150 and 155 of the master switch and opening switch arms 150, 156 and 157, thereby restoring the electrical circuit in readiness for the following sizing cycle.

Near the end of each complete cycle of operation of cam 81, disks 124 and 125 and arm elements 129 and 130, the combined trip and stop 131 drops back into engagement with shoulder 126 thus bringing driven disk 125 to rest by disengaging the dog 136 from engagement with the teeth of the constantly revolving driving disk 124.

While the sizing elements are gripping the opposite edges of the tile, edge 58 of the gauge head is pressed firmly through the action of spring 72 flat against the adjacent side edge of the tile, thus forcing the tile with its opposite side edge flat against the compensating abutment bar 50. As a result the gauge arms respond by swinging to right or left from median position. When the sizing head G has reached its forward limit of travel, as determined by the particular tile which is embraced, the closed circuit through switches I and K energizes the particular stamping solenoids selected by the switch arms 57 and 67 and cause the stamping elements to function by printing a complete record of the measurements determined by the gauge elements. Upon switches I and K closing, one or more stamping solenoids may be actuated as has been selected by arm 67 across series of switch contacts 68, determining the size to be stamped on the back of the tile. It will be noted that the taper switch arm 57 is rigidly attached to the sizing head G and if the opposed side edges in contact with the sizing elements 55 and 56 taper and are out of parallel it will therefore cause bar 57 to swing into contact with either of the taper controlling contact eccentrics 69 and 70. These taper indicating contacts actuate a stamping solenoid such as 90, operating simultaneously with the sizing stamps. The eccentrics 69 and 70 are adjustable apart to confine the range of movement of the taper switch arm either way.

As an illustration of sizing and recording a tile, which for example is of excessive width as compared with a known standard size and in addition faulty as to taper (opposed edges not being parallel, the tile X shown in Fig. 17 is illustrated as having been printed by the machine to indicate that .007 inch wider than the size of the tile adopted as a standard, and that its taper is greater than the .12 inch tolerance allowable. In this instance the arm 57 attached rigidly to the sizing head G is swung either to right or left to contact either eccentric 70 or 71, these eccentrics having been adjusted to a predetermined tolerance of .012 of an inch. The arm 67 in this event was swung from median position to the left into contact with both the center contact 68 and the one next to it.

The type inking roller 106 revolves over the surface of the inking disk 110 and receives an evenly spread supply of ink while the carriage H reciprocates. During the median portion of each cycle of operation of the machine the overhead frame L is raised into the position shown in Fig. 13 by the pair of guide rollers 102 bearing upwardly against the guide runners 97 and the inking roller 106 sweeps over and inks the lower printing surfaces of the type on the printing type elements 95 of the stamping head F. The inking disk in turn is revolved step by step during the reciprocation of the carriage by the ratchet mechanism, below the inking disk, which receives its initial motion by the reciprocable bar 116 on the table 73 being struck by the transverse bar 115 on the carriage H, near the end of each forward movement of the carriage. In this manner the inking supply surface is constantly changed to provide even distribution of ink.

In accordance with the patent statutes, I have described the principles of operation of my invention, together with the apparatus which I now consider to represent the best embodiment thereof, but I desire to have it understood that the apparatus shown is only illustrative and that the invention can be carried out by other means and applied to uses other than those above set forth within the spirit thereof and within the scope of the following claims.

I claim:

1. A machine for sizing tiles which have opposed side edges varying in width and taper, comprising, a carrier for moving and supporting a series of tiles thereon to be measured, gauge elements movably supported above the carrier and adapted to grasp each tile by its opposed side edges, one of the gauge elements comprising a compensating abutment and the other comprising a head having a controlling switch arm movable to register variations in taper of the opposed side edges of one of the tiles, and an auxiliary switch arm influenced by the adjustment of said head when engaging a tile and movable to register variations in width between the opposed side edges thereof, a recorder having stamping elements above the surface of the tile engaged by said gauge elements and coactively connected with said switch arms to actuate said stamping elements and record the width and taper registered by the gauge elements upon a surface of a tile which is engaged.

2. In a machine for sizing articles, testing mechanism for determining the taper between opposite longitudinal side edges thereof, a conveyer for simultaneously moving a series of the articles into successive operative position with relation to the testing mechanism, means for driving the conveyor, means actuated by said driving mechanism for causing the testing mechanism to function, said testing mechanism comprising an abutment and a cooperating gauge between which the articles are engaged by their longitudinal side edges, said gauge being freely tiltable to automatically correspond with the taper of the side edges of each article, and stamping mechanism actuated by the movement of said gauge.

3. In a machine for sizing articles, testing mechanism for determining the width and taper between opposite longitudinal side edges thereof, a conveyor for simultaneously moving a series of articles into successive operative position with relation to said testing mechanism, means for driving the conveyor, and means operated by said driving means for actuating the testing mechanism, said testing mechanism comprising an abutment and a cooperating gauge between which the articles are successively engaged by their longitudinal side edges, said gauge being movable in relation to said abutment to measure the width between said longitudinal side edges of each article and being freely tiltable to automatically correspond with and register the taper of said side edges.

4. In a machine for sizing tiles as defined in claim 3, stamping mechanism operated by the gauge to automatically mark each tile in accordance with variations in width and taper which are determined by said gauge.

WILBERT ORVILLE BENNING.